United States Patent
Torres et al.

(10) Patent No.: US 7,845,237 B2
(45) Date of Patent: Dec. 7, 2010

(54) MEASURING INSTRUMENT FOR GYRATORY CRUSHER AND METHOD OF INDICATING THE FUNCTIONING OF SUCH A CRUSHER

(75) Inventors: Mauricio Torres, Malmö (SE); Jonas Gustavsson, Rydsgård (SE)

(73) Assignee: Sandvik Intellectual Property AB, Sandviken (SE)

( * ) Notice: Subject to any disclaimer, the term of this patent is extended or adjusted under 35 U.S.C. 154(b) by 205 days.

(21) Appl. No.: 12/216,141

(22) Filed: Jun. 30, 2008

(65) Prior Publication Data

US 2009/0008486 A1 Jan. 8, 2009

(51) Int. Cl.
    *G01N 3/08* (2006.01)
(52) U.S. Cl. .......................................... 73/821; 73/760
(58) Field of Classification Search ........... 73/818–825, 73/760
See application file for complete search history.

(56) References Cited

U.S. PATENT DOCUMENTS

| | | | | |
|---|---|---|---|---|
| 3,568,938 A | * | 3/1971 | Barrot et al. ............... | 241/24.1 |
| 3,754,716 A | * | 8/1973 | Webster ...................... | 241/208 |
| 4,856,716 A | * | 8/1989 | Burstedt ...................... | 241/30 |
| 5,580,003 A | * | 12/1996 | Malone et al. ................ | 241/30 |
| 5,694,338 A | | 12/1997 | Inomata et al. | |
| 5,927,623 A | * | 7/1999 | Ferguson et al. .............. | 241/36 |
| 7,152,822 B2 | * | 12/2006 | Evertsson .................... | 241/207 |
| 7,360,726 B2 | * | 4/2008 | Nilsson et al. ................ | 241/30 |
| 7,630,871 B2 | * | 12/2009 | Cole et al. .................... | 703/8 |
| 2006/0231650 A1 | | 10/2006 | Nilsson et al. | |
| 2006/0243833 A1 | | 11/2006 | Nilsson et al. | |
| 2009/0256015 A1 | * | 10/2009 | Torres et al. .................. | 241/30 |

FOREIGN PATENT DOCUMENTS

| DE | 219 683 A1 | 3/1985 |
|---|---|---|
| WO | WO 2005/007293 | 1/2005 |

OTHER PUBLICATIONS

International Search Report mailed Oct. 1, 2008 issued in PCT Application No. PCT/SE2008/000402.

* cited by examiner

*Primary Examiner*—Max Noori
(74) *Attorney, Agent, or Firm*—Drinker Biddle & Reath LLP (57) ABSTRACT

A measuring instrument for indicating the load in a gyratory crusher includes a first measuring device for measuring at least one instantaneous load on the crusher, a second measuring device for measuring the gyrating position of the inner shell relative to the outer shell, and a correlating device adapted to match said at least one instantaneous load on the crusher with a corresponding measured gyrating position of the inner shell relative to the outer shell.

13 Claims, 8 Drawing Sheets

MEASURING INSTRUMENT FOR GYRATORY CRUSHER AND METHOD OF INDICATING THE FUNCTIONING OF SUCH A CRUSHER

CROSS-REFERENCE TO PRIOR APPLICATION

This application claims priority to Sweden Application No. 0701638-9 filed Jul. 6, 2007, which is incorporated by reference herein.

FIELD OF THE INVENTION

The present invention relates to a measuring instrument for indicating the load in a gyratory crusher, which includes a crushing head on which an inner shell is mounted, and a frame on which an outer shell is mounted, which outer shell defines together with the inner shell a crushing gap, a driving device being arranged to cause the crushing head to execute a gyratory pendulum movement with a view to crushing a material that is introduced in the crushing gap. The present invention further relates to a method of indicating the functioning of a gyratory crusher of the type stated above. The present invention also concerns a gyratory crusher of the type stated above.

BACKGROUND OF THE INVENTION

A gyratory crusher has a crushing head on which a substantially conical inner shell is mounted. An outer shell is mounted in a crusher frame in such a manner that it surrounds the inner shell, a crushing gap being formed between the inner shell and the outer shell. In the course of the crushing operation, the crushing head, and thereby the inner shell, executes a gyratory pendulum movement, which causes a material, for example rock, that is introduced in the crushing gap to be crushed into smaller size.

It is often desirable to be able to feed as much material as possible into a gyratory crusher without overloading the crusher. WO 2005/007293 discloses a method of controlling a gyratory crusher to obtain a high load without overloading the crusher. In the method disclosed in WO 2005/007293 instantaneous loads on the crusher are measured and a mean value is calculated, which is representative of the highest instantaneous loads. This mean value, which may be designated as the mean peak pressure, is used to control the crusher to allow feeding of a large amount of material without overloading the crusher. An indicating instrument indicates whether the operation of the crusher is effective or not by comparing the mean peak pressure and the mean pressure. However, it would be desirable to find a way to further increase the amount of material that can be fed to the crusher without overloading it.

OBJECTS AND SUMMARY OF THE INVENTION

One object of the present invention is to provide a measuring instrument by way of which it is possible to obtain an indication as to whether the operation of the crusher is effective or not.

This object is achieved by a measuring instrument for indicating the load in a gyratory crusher of the type stated above, the measuring instrument including a first measuring device for measuring at least one instantaneous load on the crusher, a second measuring device for measuring the gyrating position of the inner shell relative to the outer shell, and a correlating device which is adapted to match the at least one instantaneous load on the crusher with a corresponding measured gyratory position of the inner shell relative to the outer shell.

One advantage of this measuring instrument is that it is capable of indicating whether part of the crusher is not operating effectively. The measuring instrument may, for instance, indicate that part of the crusher could withstand a higher load, which would allow an increase of the amount of material to be crushed. The measuring instrument may also indicate that the supply of material to the crusher may need adjusting.

According to one embodiment, the measuring instrument further includes an indicating dial, such as a display screen, which is arranged to optically indicate the measured gyrating position and the instantaneous load matched therewith. One advantage of this embodiment is that an operator who operates a gyratory crusher may receive a clear indication as to whether the operation of the crusher is effective or not. In the latter case, the operator may receive information as to where in the crusher measures need to be taken. Such measures may include changing the position of a feeder, for instance a belt feeder or a vibrating feeder, or influencing how the material is applied onto the feeder.

According to one embodiment, the measuring instrument includes an indicating dial, which is arranged to optically indicate at which point along the inner periphery of the outer shell the measured instantaneous load is the highest. One advantage of this embodiment is that it allows an operator to easily identify where to take measures first.

According to one embodiment, the measuring instrument includes an indicating dial, which is arranged to optically indicate at which point along the inner periphery of the outer shell the measured instantaneous load is the highest and to indicate the size of the measured instantaneous load at this point. One advantage of this embodiment is that it allows an operator to identify both where the load is the highest and its magnitude, and thus to determine whether measures need to be taken or not, and where to direct these measures.

According to one preferred embodiment, the indicating dial includes a vector, which originates from the origin of coordinates and points towards the point along the inner periphery of the outer shell at which the synchronous pressure component of the measured load is the highest, the length of the vector corresponding to the amplitude of the synchronous pressure component. The advantage of the vector is that it provides a clear indication as to where in the crusher the load is the highest, and how large the synchronous component of the load is.

According to one preferred embodiment, the indicating dial includes a polar graph, which originates from the origin of coordinates and which shows the measured load in at least three points along the inner periphery of the outer shell. The advantage of the polar graph is that it is able to indicate not only where the load on the crusher is high, but also where the load on the crusher is low, and therefore may be increased to obtain a more efficient crushing operation.

A further object of the present invention is to provide a method of indicating the functioning of a gyratory crusher, which method facilitates the setting of the crusher to obtain a more effective crushing operation.

This object is achieved by a method of indicating the functioning of a gyratory crusher, which is of the kind described above, the method including at least one instantaneous load on the crusher is measured, the gyrating position of the inner shell relative to the outer shell is measured, and the at least one instantaneous load is matched with the corresponding measured gyrating position of the inner shell relative to the outer shell.

One advantage of this method is that an indication as to where in the crusher the measured load occurs is obtained. This allows differences in the crushing process in different parts of the crushing gap to be analyzed and, as a result of this analysis, measures to be taken for the purpose of obtaining a more even crushing process in the different parts of the crushing gap.

According to one preferred embodiment, the highest measured load along the inner periphery of the outer shell is determined and matched with the corresponding gyrating position of the inner shell relative to the outer shell. One advantage of this method is that it allows easy identification of the part of the crushing gap in which measures are most needed.

A further object of the present invention is to provide a gyratory crusher which may be more easily adjusted to obtain an effective operation.

This object is achieved by a gyratory crusher which is of the kind stated above including a first measuring device for measuring at least one instantaneous load on the crusher, a second measuring device for measuring the gyrating position of the inner shell relative to the outer shell, and a correlating device which is adapted to match the at least one instantaneous load on the crusher with a corresponding measured gyrating position of the inner shell relative to the outer shell.

One advantage of this gyratory crusher is that information may be obtained as to where along the inner periphery of the outer shell the crushing effectiveness may be improved, for example by supplying more material, less material, or a material of a different composition.

Further advantages and features of the invention will be apparent from the following description and the appended claims.

BRIEF DESCRIPTION OF THE DRAWINGS

The invention will be described below by way of embodiments and with reference to the appended drawings.

FIG. 4b is a schematic diagram illustrating a mean pressure component derived from FIG. 4a.

FIG. 4d is a schematic diagram illustrating a high-frequency varying pressure component derived from FIG. 4a.

DETAILED DESCRIPTION OF THE PREFERRED EMBODIMENTS

Figure 1:
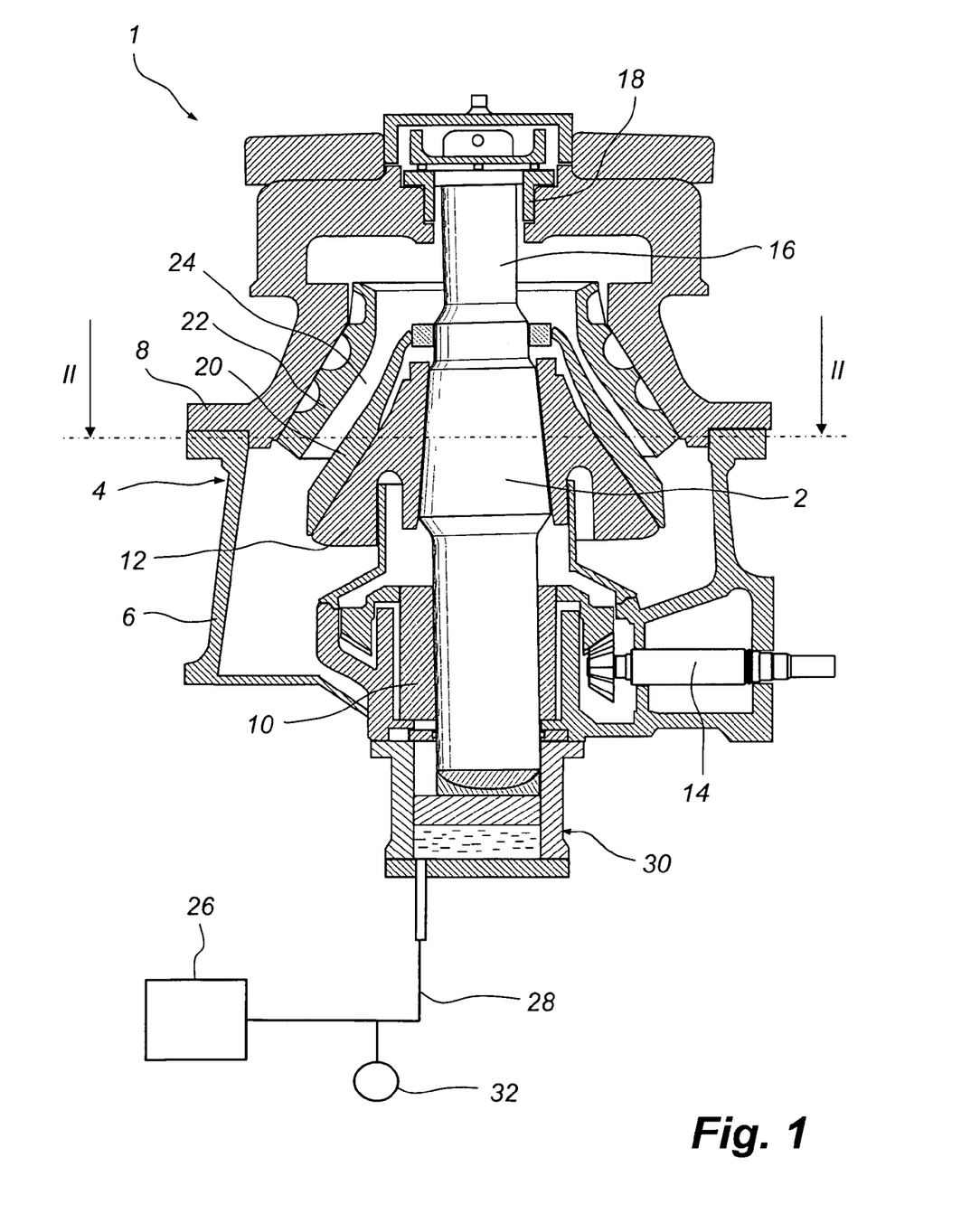
FIG. 1a is a vertical section view of a gyratory crusher.

FIG. 1 illustrates schematically a gyratory crusher 1. The gyratory crusher 1 has a vertical shaft 2 and a frame 4 including a frame bottom part 6 and a frame top part 8. An eccentric 10 is rotatably arranged about the vertical shaft 2. A crushing head 12 is fixedly mounted about the vertical shaft 2. A drive shaft 14 is arranged to rotate the eccentric 10 by way of a motor (not shown). The vertical shaft 2 is journalled, at its upper end 16, in a top bearing 18 in the frame top part 8. As the drive shaft 14 rotates the eccentric 10, during operation of the crusher 1, the crushing head 12 will be made to rotate, executing in this connection a gyratory movement.

A first crushing shell in the form of an inner shell 20 is fixedly mounted on the crushing head 12. A second crushing shell in the form of an outer shell 22 is fixedly mounted on the frame top part 8. Between the two shells 20, 22, a crushing gap 24 is formed, the width of which, in axial section, decreases in the downward direction, as illustrated in FIG. 1. A material to be crushed may be introduced in the crushing gap 24 and is crushed between the inner shell 20 and the outer shell 22 due to the gyratory movement of the crushing head 12, a movement during which the two shells 20, 22 approach one another along a rotating generatrix and move away from one another along a diametrically opposed generatrix.

A hydraulic pump device 26 is arranged to supply a pressurized hydraulic fluid, via a conduit 28, to a hydraulic piston arrangement 30 positioned below the vertical shaft 2. The hydraulic piston arrangement 30 enables adjusting of the vertical position of the shaft 2 and absorption of the loads generated by the material being crushed in the crushing gap 24. A pressure gauge in the form of a manometer 32 is arranged to measure the pressure in the conduit 28, the pressure corresponding to the pressure in the hydraulic piston arrangement 30 and indicating the load on the crusher 1.

Figure 2:
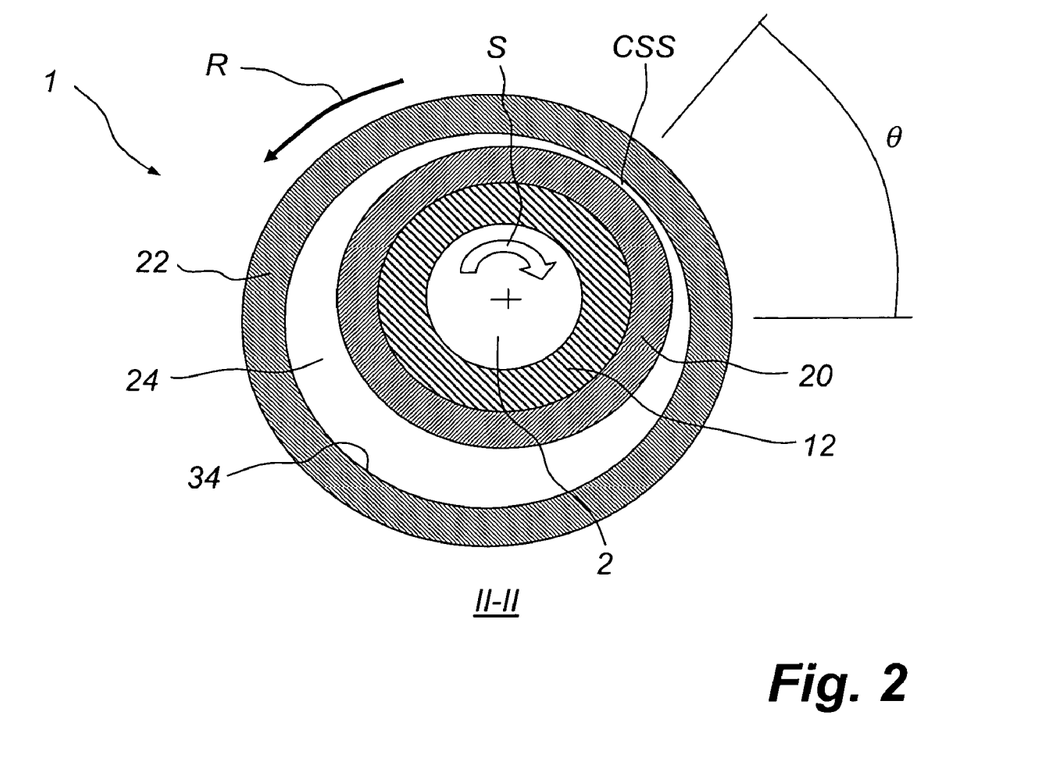
FIG. 2 is a horizontal section view of the gyratory crusher according to FIG. 1 along the line II-II.

FIG. 2 shows the crusher 1 as seen in the cross section II-II according to FIG. 1. For the sake of clarity, FIG. 2 shows only the outer shell 22, the vertical shaft 2, which carries the crushing head 12, and the inner shell 20 that is attached on the outside of the crushing head 12. As shown in FIG. 2, the crushing gap 24 will have a narrowest width, called CSS, in the position in which the inner shell 20 is located closest to the outer shell 22. As the eccentric 10, which is shown in FIG. 1 and in FIG. 3, rotates, the position of the narrowest width CSS will move along the inner periphery 34 of the outer shell 22 in a counter-clockwise direction as indicated by an arrow R. The current position of the CSS along the inner periphery 34 of the outer shell 22 is referred to below as "the gyrating position" and is illustrated in FIG. 2 by an angle θ. Accordingly, in FIG. 2 the current gyrating position, i.e., the point on the inner periphery 34 of the outer shell 22 to which the inner shell 20 is closest at a given moment, is located in the upper right corner. One appropriate way of describing a current gyrating position is to select a starting point on the inner periphery 34 of the outer shell 22 and, based on this starting point, indicate the number of degrees of a full turn, i.e., 360°, that the gyrating position has moved at a given moment. Thus, in FIG. 2, the right end of the inner shell 22, for example, may be selected as the starting point, i.e., 0°, in which case the gyrating position, θ, which is shown in FIG. 2, corresponds to the CSS having been moved about 70° from the starting point, in the direction indicated by the arrow R, i.e., θ=70°.

In the course of the crushing operation, the material to be crushed will be located between the inner shell 20 and the outer shell 24, i.e., in the crushing gap 24, which means that the inner shell 20 rolls against the outer shell 22 in a counter-clockwise direction, as indicated by an arrow S, which thus means that, during crushing, the vertical shaft 2 rotates clockwise about its own axis.

Figure 3:
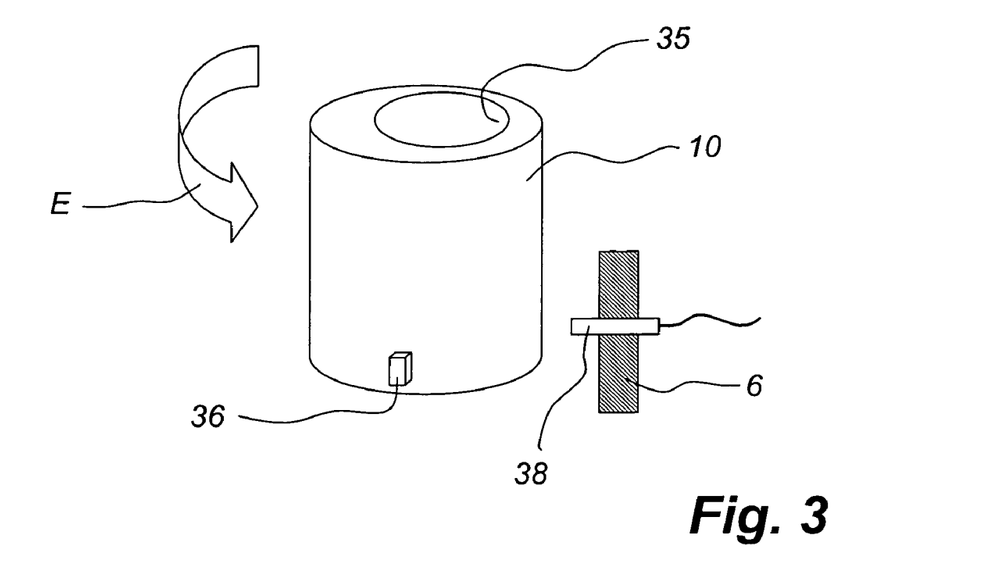
FIG. 3 is a schematic side view of an eccentric.

FIG. 3 shows the eccentric 10 in more detail. The eccentric 10 is provided with an eccentric hole 35 in which the vertical shaft 2 is arranged to rotate. An arrow E indicates the direction of rotation in which the eccentric 10 is caused to rotate by the drive shaft 14 shown in FIG. 1. A rotation according to the arrow E in FIG. 3 will produce the displacement of the CSS shown in FIG. 2, in the direction of the arrow R, along the inner periphery 34 of the outer shell 22. At least one sensing element, which may be for example a magnetic element 36, is attached to the eccentric 10. The magnetic element 36 will rotate together with the eccentric 10. A sensor, which in the present case is suitably a magnetic sensor 38, is attached to the frame bottom part 6 and is arranged to sense the passage of the magnetic element 36.

Since the CSS is the narrowest part of the crushing gap 24, the greatest crushing forces in the crusher 1 will usually, at a given moment, be generated in the position on the inner periphery 34 of the outer shell 22 where the CSS is located at a given moment, i.e., in the position defined above as the gyrating position, θ. In the instant shown in FIG. 3, the greatest crushing forces in the crusher will thus be generated in the upper right part, as shown in FIG. 2.

Figure 4A:
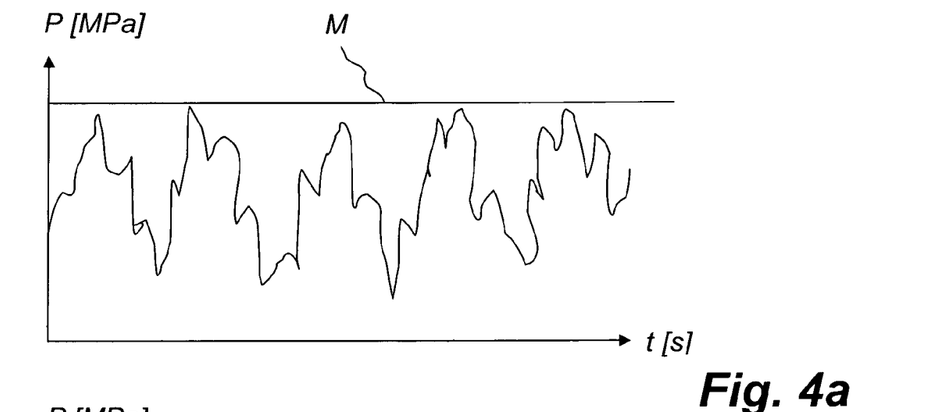
FIG. 4a is a schematic diagram illustrating a hydraulic pressure graph.

FIG. 4a illustrates schematically a pressure profile measured by way of the manometer 32 during crushing of material in the crusher 1. The longitudinal axis, the x-axis, indicates the time t, for example in seconds, and the lateral axis, the y-axis, indicates the pressure P in the hydraulic fluid. The pressure P in the hydraulic fluid is representative of the size of the load to which the crusher 1 is subjected. Normally, a crusher is operated in such a manner that a certain maximum pressure, indicated as a pressure M in FIG. 4a, may not be exceeded. Should the pressure M be exceeded, the narrowest width CSS is increased by lowering of the vertical shaft 2 with the aid of the hydraulic piston arrangement 30, shown in FIG. 1, which reduces the load on the crusher 1.

Figure 4B:
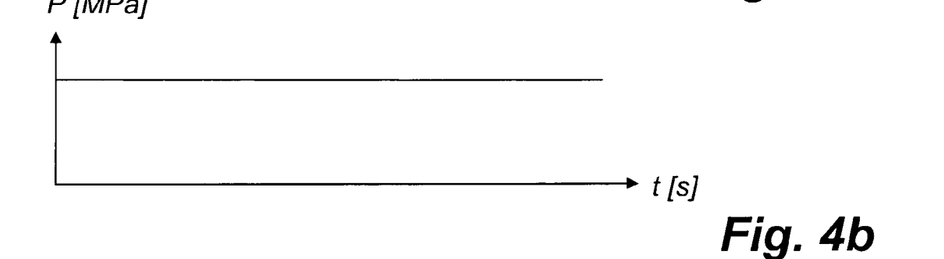
Figure 4C:
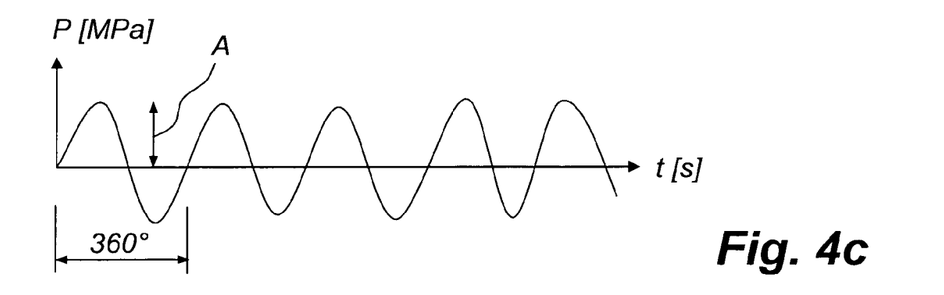
FIG. 4c is a schematic diagram illustrating a pressure component derived from FIG. 4a which is synchronous with the rotation of an eccentric incorporated in the gyratory crusher and which is called a synchronous pressure component.
Figure 4D:
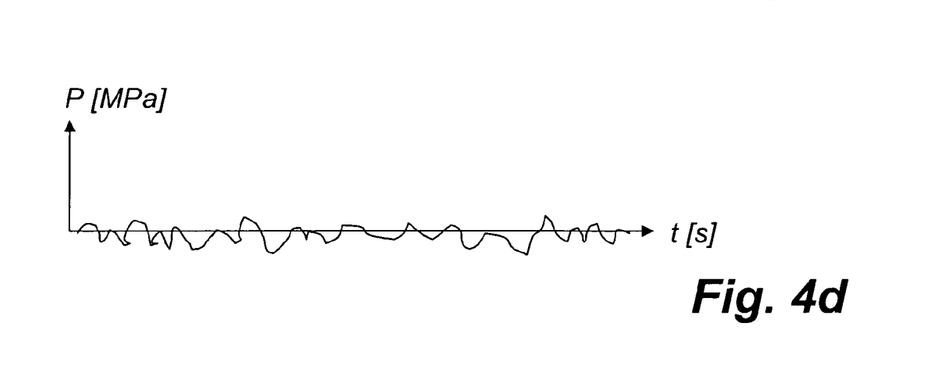

It has been found that the pressure profile shown in FIG. 4a may be divided into three main components, which are illustrated in FIGS. 4b, 4c and 4d. By adding these three main components one will arrive at the pressure profile shown in FIG. 4a.

The first component is the mean pressure, as shown in FIG. 4b. It is desirable to keep the mean pressure as high as possible without exceeding the maximum pressure M according to FIG. 4a, since this means that the crusher 1 operates effectively.

FIG. 4c illustrates a second pressure component that is synchronous with the rotation of the eccentric 10. This pressure component, which may be referred to as a synchronous pressure component, has a sinusoidal shape, where one cycle corresponds to one turn, i.e., 360°, of the eccentric 10, as is indicated in FIG. 4c. It has now been found that this pressure component, which is illustrated in FIG. 4c, depends on unevenness in the supply of material to the crusher. Such unevenness may, for example, be due to the fact that the supply of material to the crusher is such that most of the material ends up at one side of the crusher, or that the material is segregated, i.e., is unevenly distributed with respect to coarse and fine fractions, already when being conveyed to the crusher. Segregation may result in one end of the crusher receiving mostly fine material and the other end receiving mainly coarse material. Since the operation of crushing fine material normally results in considerably larger loads on the crusher, such segregation means that loads are unevenly applied on the crusher 1, even if the supply of material in kilograms per hour is substantially even, as seen along the inner periphery 34 of the outer shell 22. In FIG. 4c, an arrow indicates the amplitude A of the sinusoidal graph, i.e., the synchronous pressure component. It is desirable to keep the amplitude A of the synchronous pressure component as small as possible, since a small amplitude A means that the crushing forces, when the eccentric 10 rotates a full turn, i.e., 360°, are more or less the same during the whole turn, which means that the operation of the crusher is effective. By adjusting the supply of material to the crusher 1, it is possible to reduce the amplitude A, as will be shown below, which means that the crushing operation can be made even more effective.

FIG. 4d shows a third pressure component. This pressure component illustrates the high-frequency pressure variation that is caused by the fact that different individual objects, for example rocks, require more or less effort to crush and, therefore, give different manometer 32 deflections. This pressure component depends on the individual objects fed to the crusher and cannot normally be influenced by adjusting the material feed to the crusher.

Figure 5:
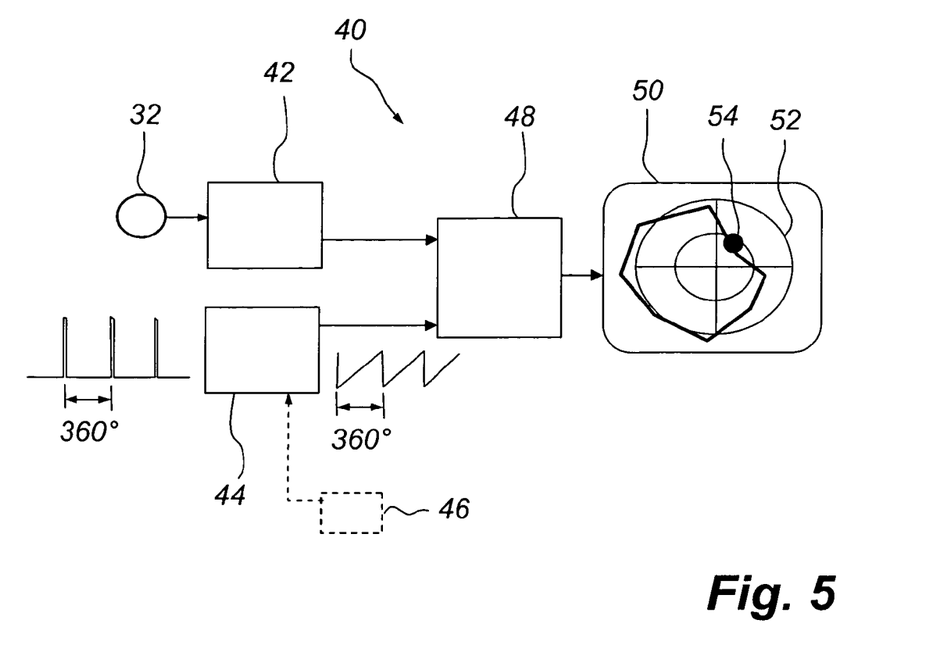
FIG. 5 is a schematic illustration of a measuring instrument.

FIG. 5 shows a measuring instrument 40 by way of which it is possible to analyze the measured pressure profile according to FIG. 4a, and to indicate where along the inner periphery 34 of the outer shell 22 the load at the CSS will be too high as well as where along the inner periphery 34 of the outer shell 22 more material can be supplied without the load at the CSS becoming too high.

The measuring instrument 40 includes a first signal receiver in the form of a pressure measuring signal receiver 42 and a second signal receiver in the form of a rotation measuring signal receiver 44. The pressure measuring signal receiver 42 receives a measuring signal from the manometer 32, which signal is representative of the current instantaneous pressure in the hydraulic fluid. The instantaneous pressure of the hydraulic fluid in the hydraulic piston arrangement 30, according to FIG. 1, is dependent on the current load on the crusher 1, and, consequently, the pressure measuring signal receiver 42 receives a signal that correlates to the current instantaneous load on the crusher 1. The rotation measuring signal receiver 44 receives a measuring signal from the magnetic sensor 38, which is shown in FIG. 3. The magnetic sensor 38 indicates each revolution of the eccentric 10.

According to a first alternative, the rotation measuring signal receiver 44 includes a phase lock loop (PLL) block, which is known per se and by way of which the rotation measuring signal receiver 44 is able to calculate a continuous current angular position of the eccentric 10, i.e., in each instant the rotation measuring signal receiver 44 is able to calculate the current gyrating position, i.e., the current angle. θ˜. FIG. 5 schematically illustrates how the phase lock loop (PLL) block in the rotation measuring signal receiver 44 converts discreet pulses from the magnetic sensor 38 to a continuous angular position.

According to one alternative embodiment, which is indicated by dashed lines in FIG. 5, the rotation measuring signal receiver 44 receives a second measuring signal from a crusher drive unit 46. The measuring signal from the crusher drive unit 46 indicates, directly, or indirectly via a motor speed, the current speed of the eccentric 10. Using the information from the sensor 38 and the current speed of the eccentric 10 the rotation measuring signal receiver 44 is able to calculate, in each instant, the exact rotary position and is thus able to calculate the current gyrating position of the inner shell 20 relative to the outer shell 22, i.e., where along the inner periphery 34 of the outer shell 22 the CSS is located at a given moment.

The measuring instrument 40 further includes a correlating device in the form of a calculation processor 48. The processor 48 receives signals from the pressure measuring signal receiver 42 and the rotation measuring signal receiver 44 and matches at least one measured instantaneous pressure in the hydraulic fluid, i.e., an instantaneous load on the crusher 1, with the corresponding gyrating position, the angle θ, i.e., the position of the CSS along the inner periphery 34 of the outer shell 22 that corresponds to the measured instantaneous load. The processor 48 sends the information regarding the measured instantaneous load and the gyrating position matched therewith to an indicating dial in the form of a display screen 50, for example an LCD screen. The display screen 50 shows a circular diagram 52, which is intended to illustrate the crusher 1 seen from above, or more specifically the outer shell 22 as seen in horizontal cross-section, according to FIG. 2. Each point on the circumference of the circular diagram 52 corresponds to a point along the inner periphery 34 of the outer shell 22. FIG. 5 shows a point 54, which indicates the position of the CSS, i.e., the gyrating position, along the inner periphery 34 of the outer shell 22 shown in FIG. 2, i.e., slightly to the right of the uppermost portion of the outer shell 22, according to FIG. 2. In the diagram 52 shown in FIG. 5, the value of the instantaneous load, expressed, for example, as a pressure in MPa, is illustrated by the distance from the point 54 to the origin of coordinates of the diagram 52. Thus, the point 54 indicates both where along the inner periphery 34 of the outer shell 22 the instantaneous load was measured and its size.

Figure 6:
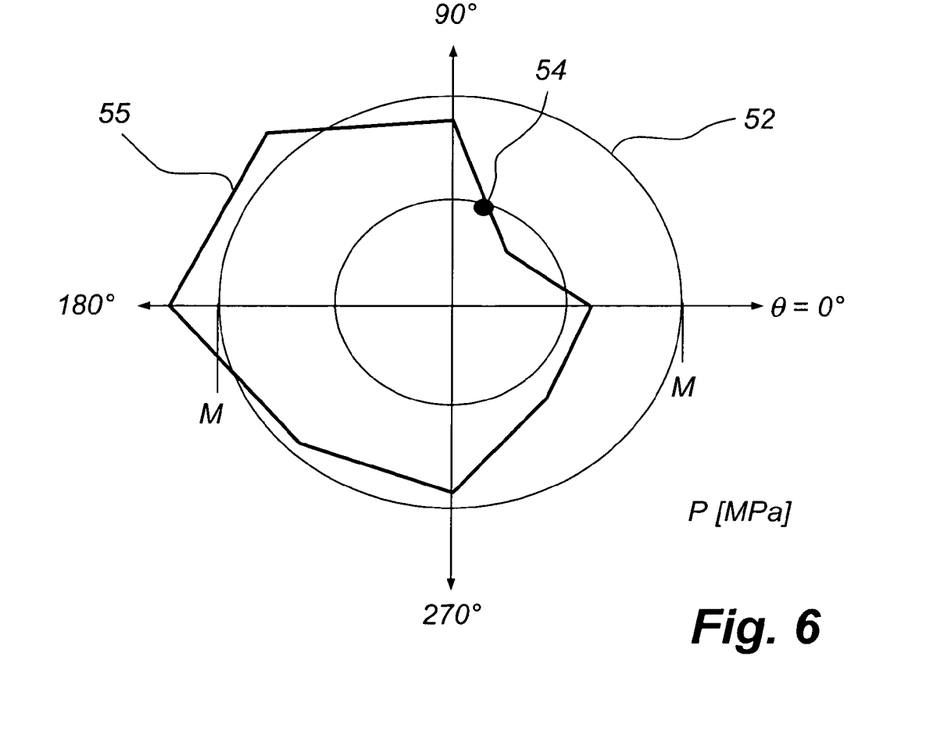
FIG. 6 is a diagram that may be displayed on the measuring instrument.

FIG. 6 is an enlargement and shows the diagram 52 shown in FIG. 5. In the diagram 52, the outer ring represents the maximum desirable load M in the crusher 1. The diagram 52 shows a polar graph 55 which represents the measured instantaneous loads, represented by pressures P measured in the hydraulic fluid, for example in eight points along the inner periphery 34 of the outer shell 22, i.e., each 45° along the inner periphery 34. These eight points have then been connected to form a polar graph. The eight points may either indicate the measured instantaneous loads during the last turn or may indicate, by way of example, the mean instantaneous load for each of the eight points during, for instance, the last ten turns. The position of the CSS shown in FIG. 2 is illustrated by the point 54. It will be appreciated that it is also possible to indicate the instantaneous pressure in more or fewer points than eight along the inner periphery 34 of the outer shell 22, suitably however in at least three points.

The diagram 52 shows, according to FIG. 6, that the load on the crusher 1 is significant at the left side of the crusher 1, i.e., about θ=180° according to FIG. 6. However, the load on the right side of the crusher 1, i.e., about θ=0° and, in particular, in the upper right side, at θ=45°, is considerably smaller. Accordingly, the diagram 52 shows that the load on the crusher is uneven and that the operation of the crusher 1 is not effective.

Figure 7:
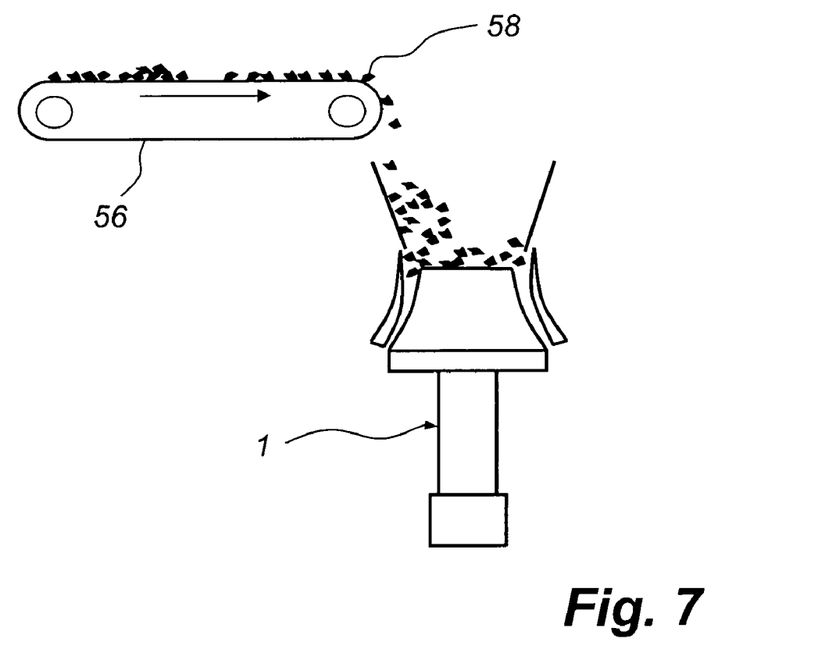
FIG. 7 is a side view schematically illustrating a material feed that may produce a graph such as the one shown in FIG. 6.

FIG. 7 shows how a belt conveyor 56 feeds material 58 to the crusher 1. As indicated in FIG. 7, the greater part of the material ends up in the left side of the crusher 1, which explains the uneven load illustrated in the diagram 52 in FIG. 6. During real operation, it is often very difficult to visually detect an uneven feed, of the type shown in FIG. 7, and the diagram 52 shown in FIG. 6 thus very advantageously enables an operator to identify where in the crusher 1 the amount of supplied material is uneven.

Figure 8:
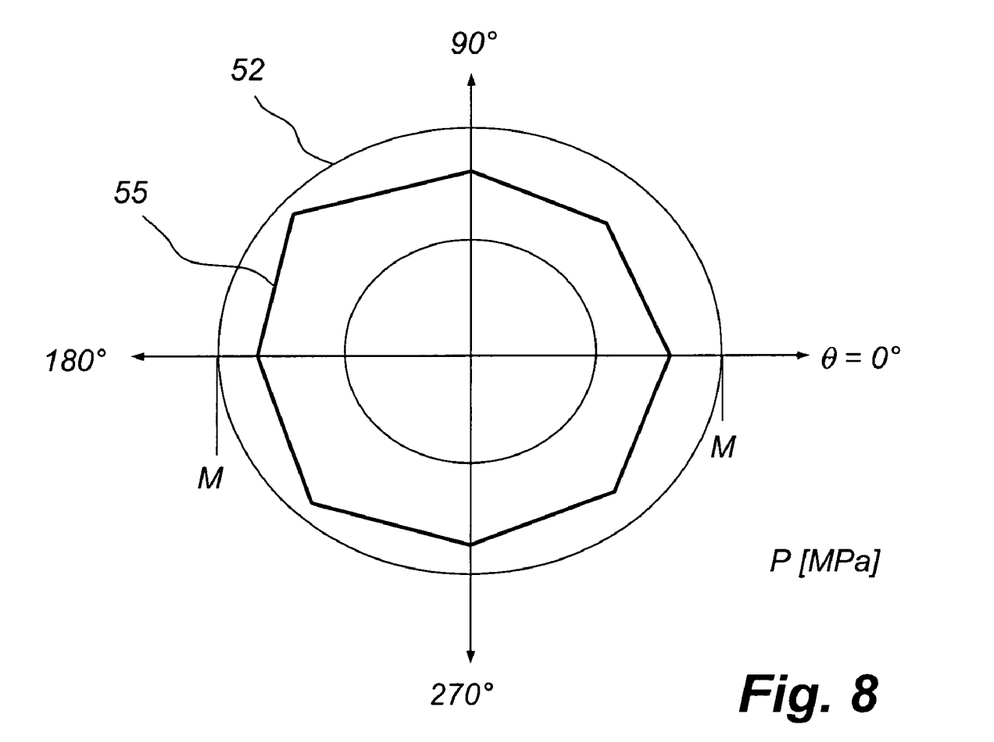
FIG. 8 is a diagram illustrating a graph obtained after measures for improving the material feed have been taken.

FIG. 8 shows the diagram 52 of FIG. 6 after the operator has taken measures to obtain a more even supply of material to the crusher 1. Such measures may include adjusting the position of the belt conveyor 56, adjusting the distribution of the material 58 on the belt conveyor 56 to reduce the segregation of fine and coarse material, adjusting the manner in which the material is fed to the belt conveyor 56, adjusting the material that is fed to the belt conveyor 56, etc. As appears from FIG. 8, the differences between the measured instantaneous pressures in the eight points are considerably smaller than in FIG. 6. This results in a higher mean pressure in the crusher, i.e., the pressure illustrated in FIG. 4b may be increased, which allows a more efficient use of the crusher 1 without causing excessive loads, i.e., without the maximum pressure M illustrated in FIG. 4a being exceeded. Thus, the measuring instrument 40 helps the operator to adjust the crusher 1, in particular the material feed to the crusher 1, such that the operation of the crusher 1 becomes as effective as possible. The more the shape of the polar graph resembles a perfect circle, with its center in the origin of coordinates, the more even the material feed to the crusher 1, and the more effective the operation of the crusher 1. The radius of such a perfect circle corresponds to the mean pressure, which should be as high as possible, without exceeding the maximum allowable pressure M.

Figure 9:
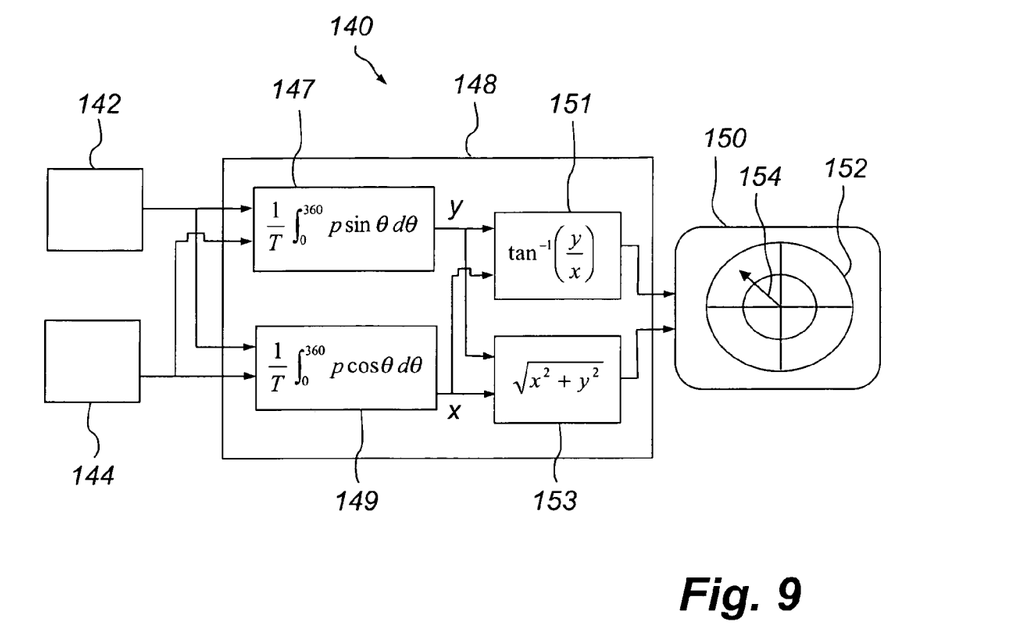
FIG. 9 is a schematic illustration of a measuring instrument according to an alternative embodiment.

FIG. 9 shows an alternative embodiment in the form of a measuring instrument 140 by way of which it is possible to analyze the measured pressure profile according to FIG. 4a. The principles behind this analysis differ slightly from the analysis performed by the measuring instrument 40 described above. The measuring instrument 140 is arranged to analyze the synchronous pressure component, according to FIG. 4c, and to indicate the amplitude and phase angle of the synchronous pressure component, i.e., the size of the amplitude A according to FIG. 4c, and where along the inner periphery 34 of the outer shell 22 the amplitude A occurs.

The measuring instrument 140 includes a first signal receiver in the form of a pressure measuring signal receiver 142 and a second signal receiver in the form of a rotation measuring signal receiver 144. The functioning of the pressure measuring signal receiver 142 is similar to that of the pressure measuring signal receiver 42 as described above. The rotation measuring signal receiver 144 receives a measuring signal from the magnetic sensor 38. The magnetic sensor 38 indicates each revolution of the eccentric 10. The rotation measuring signal receiver 144 includes a phase lock loop (PLL) block, which is known, per se, and by way of which the rotation measuring signal receiver 144 is able to calculate a continuous current angular position of the eccentric 10, i.e., in each instant the rotation measuring signal receiver 144 is able to calculate the current gyrating position, i.e., the current angle θ, in accordance with the principles described above in connection with FIG. 5.

Once the current gyrating position of the crusher 1 has been determined, i.e., the current angle θ has been determined by the PLL block as described above, internal sine and cosine signals are generated in a processor 148 based on the current gyrating position, i.e., the current angle θ. These signals have the same cycle as the rotation of the eccentric 10 of the crusher 1 and are synchronous with the eccentric reference. This means that the sine and cosine signals execute one full cycle with each revolution of the eccentric 10. By calculating the product of each of these signals and the pressure signal P, from the pressure measuring signal receiver 142, and integrating each of these two products over a turn, and then dividing these products with the cycle of one turn, i.e., the time of one turn, Fourier coefficients for the pressure signal at the rotational frequency of the eccentric 10 are obtained. The calculation of these Fourier coefficients respectively y and x is illustrated in FIG. 9 in the blocks 147 and 149, respectively, incorporated in the processor 148. The Fourier coefficients represent the x and y coordinates for the synchronous pressure component and points to the portion of the inner periphery 34 of the outer shell 22 in which the crushing forces are the greatest, i.e., to the part of the crusher 1 to which most of the material is fed and/or to which the greater part of the material that is most difficult to crush is fed. Based on these Fourier coefficients x and y and with respect to the point on the inner periphery 34 of the outer shell 22 at which the crushing forces are the greatest, the phase angle of the synchronous component is then calculated in a block 151 according to FIG. 9, and the amplitude of the synchronous pressure component, i.e., the amplitude A according to FIG. 4c, is calculated in a block 153 according to FIG. 9. The processor 148 forwards information on the phase angle and the amplitude to a display screen 150 on which a diagram 152 is shown. In the diagram 152, the phase angle and the amplitude are represented by a vector 154, which will be described in more detail below.

Figure 10:
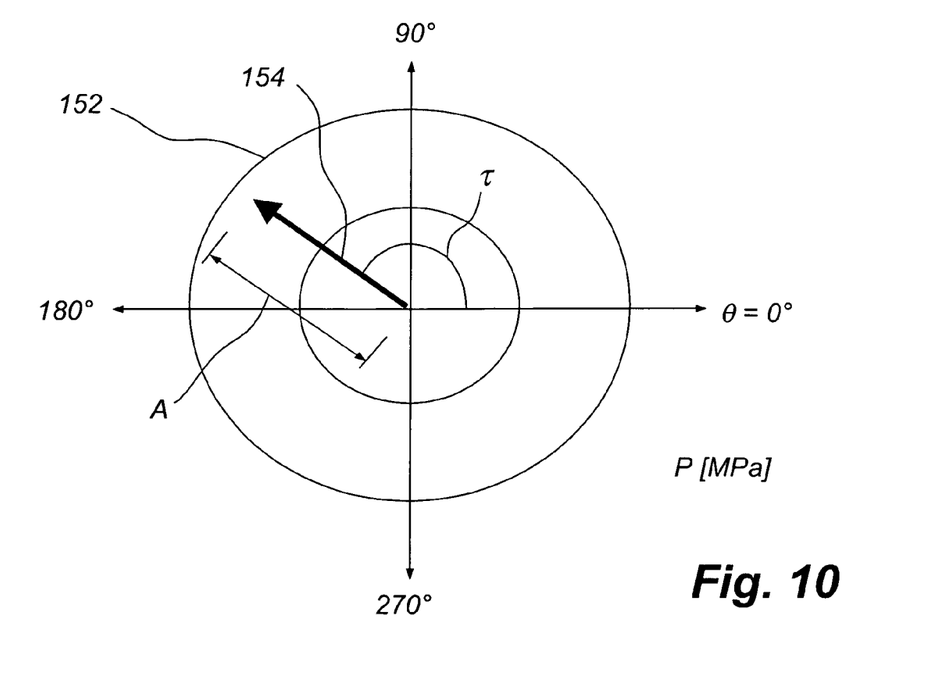
FIG. 10 is a diagram that may be displayed on the measuring instrument according to the alternative embodiment.

FIG. 10 shows the diagram 152 in more detail. The vector 154 points in the direction of a point which corresponds to the point along the inner periphery 34 of the outer shell 22 at which the amplitude A has been measured, i.e., the angle τ of the vector 154 corresponds to the phase angle that is calculated by the processor 148 according to the above. The length of the vector 154 from the origin of coordinates corresponds to the size, in MPa, of the amplitude A of the synchronous pressure component calculated by the processor 148. The diagram 152 shown in FIG. 10 shows the operator where in the crusher 1 the synchronous pressure component according to FIG. 4c is the greatest and, therefore, should be reduced, to allow a higher mean load on the crusher 1 without exceeding the maximum allowable pressure M in the hydraulic fluid. The objective is to obtain a completely even feed to the crusher 1, which corresponds to the vector 154 having no length at all since the amplitude A of the synchronous pressure component is 0 MPa when the supply of material to the crusher is completely even. Consequently, the operator should make such adjustments to the feed that the length of the vector 154 is minimized. The phase angle of the vector 154 indicates to the operator where along the inner periphery 34 of the outer shell 22 the crushing forces are the greatest, so that measures may be taken primarily in that area.

Figure 11:
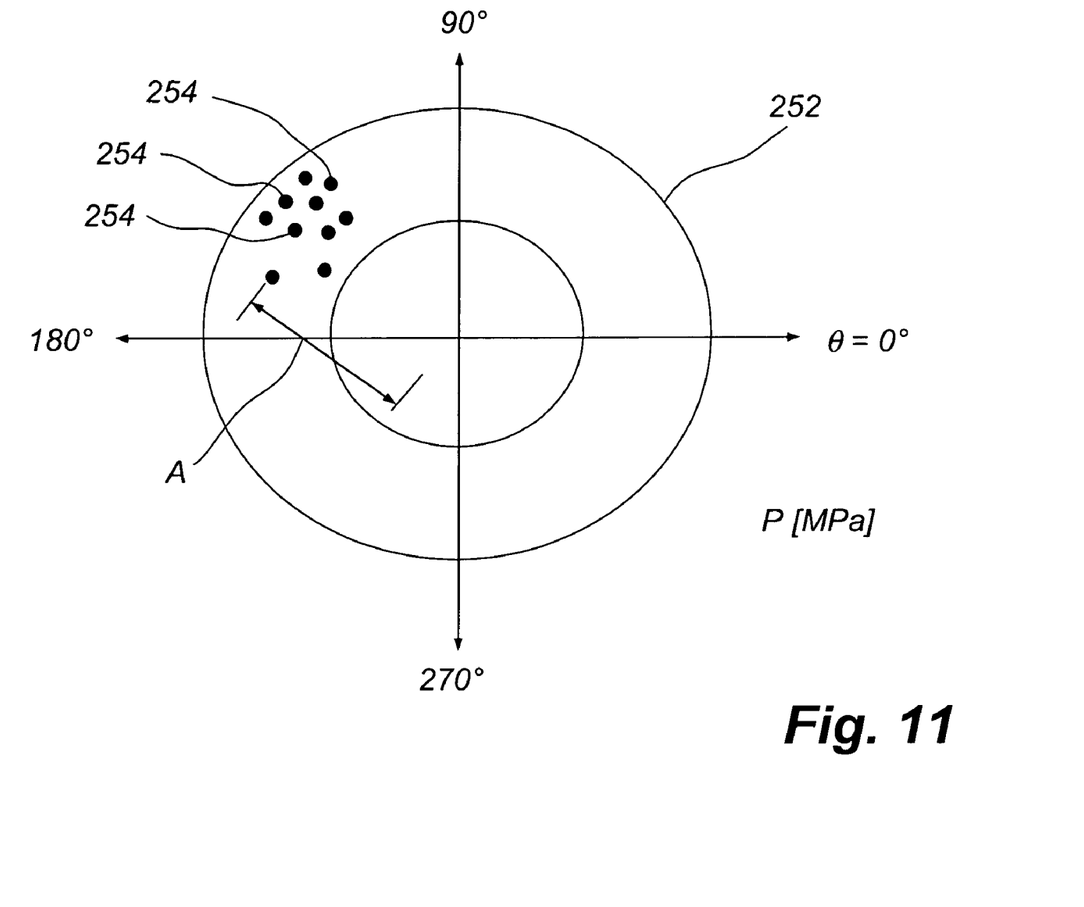
FIG. 11 is a diagram according to an additional alternative embodiment.

FIG. 11 shows an additional alternative diagram 252. In this diagram 252, the associated values of the phase angle and the amplitude A that have been calculated by the processor 148 during the last ten turns of the eccentric 10 are illustrated as points 254. The distance from each point 254 to the origin of coordinates corresponds to the amplitude A, in MPa, of the associated synchronous pressure component. Similarly to the diagram 152 shown in FIG. 10, the diagram 252 shows an operator where the crushing forces are the greatest, and where measures to improve the feed should be directed. The objective is to adjust the feed of material in such a manner that the points 254 will be located close to the origin of coordinates in the diagram 252.

Figure 12:
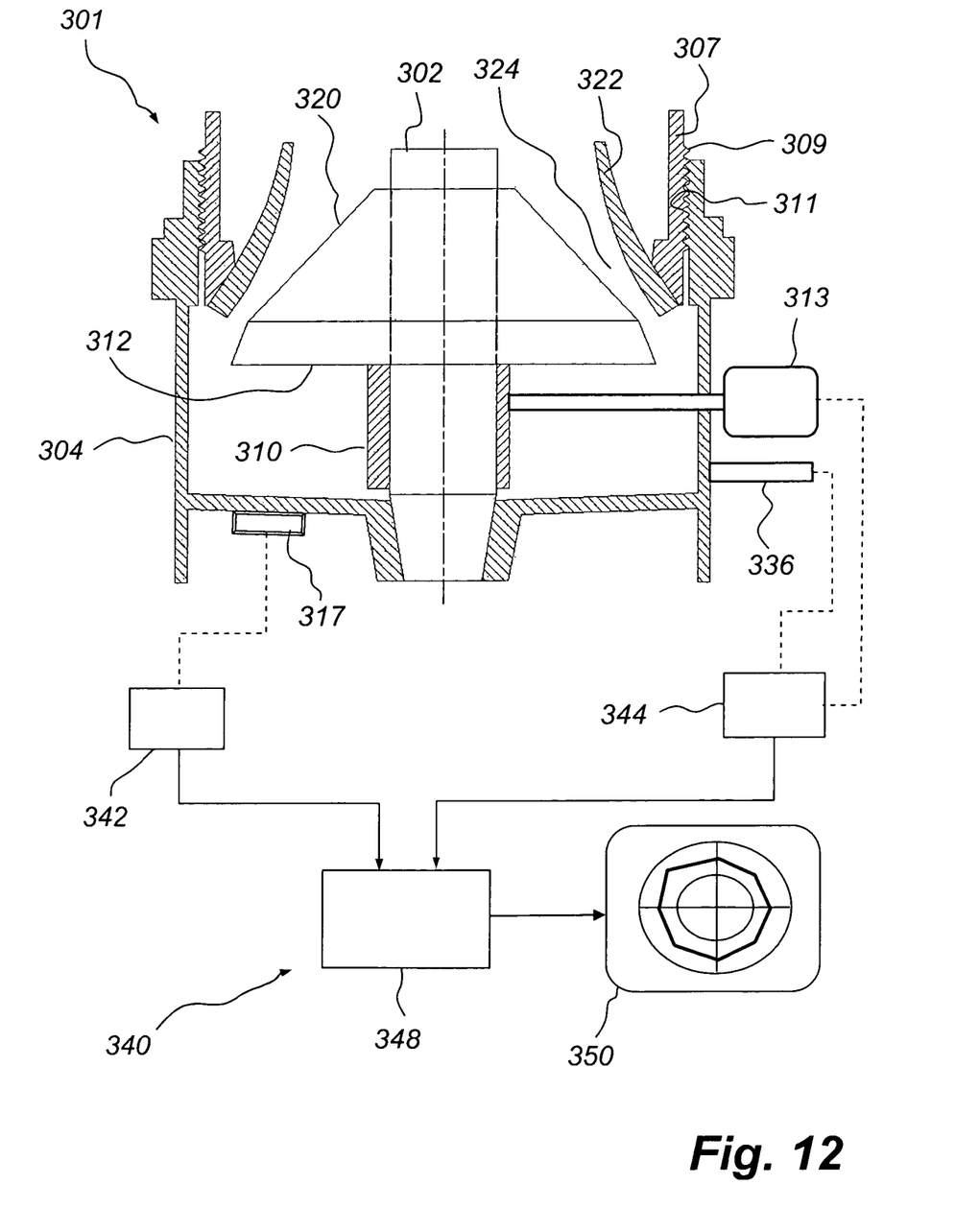
FIG. 12 is a vertical section view of a gyratory crusher according to an alternative embodiment.

FIG. 12 shows schematically a crusher 301 of a type other than the crusher 1 shown in FIG. 1. The crusher 301 shown in FIG. 12 has a shaft 302, which carries a crushing head 312 having an inner shell 320 mounted thereon. A crushing gap 324 is formed between the inner shell 320 and an outer shell 322. The outer shell 322 is attached to a sleeve 307 with a stepped thread 309. The thread 309 fits in a corresponding thread 311 in a crusher frame 304. Furthermore, there is connected to the crusher 301 a motor 313, which is arranged, during operation of the crusher 301, to drive an eccentric 310 and to cause the crushing head 312 to execute a gyratory pendulum movement. As the sleeve 307 is rotated about its symmetry axis, the outer shell 322 will be displaced in the vertical direction, which alters the width of the gap 324.

Accordingly, the crusher 301 shown in FIG. 12 has no hydraulic system in which a hydraulic pressure can be measured with a view to measuring the load on the crusher. Instead a strain gauge 317 has been arranged on the crusher frame 304. The strain gauge 317, which measures the instantaneous strain in the part of the frame 304 on which it is attached, is suitably located on the frame 304 in such a position that a typical image of the mechanical load on the crusher is obtained. A signal from the strain gauge 317 may be received in a first signal receiver in the form of a load signal receiver 342. The crusher 301 is further provided with an accelerometer 336. The rotation of the eccentric 310 in the crusher 301 will cause a movement in the frame 304 because the center of gravity of the crushing head 312 rotates along a circular path. This movement is measured by the accelerometer 336, which transmits a signal to a second signal receiver in the form of a rotation measuring signal receiver 344. It is then possible for the rotation measuring signal receiver 344 to calculate, for instance by way of a phase lock loop (PLL) block as described above, or alternatively by way of a signal from the motor 313 that indicates the speed of the eccentric 310, the current rotary position of the eccentric 310, and thereby the current position of the shortest distance CSS, i.e., the gyrating position, according to the principles described above. One advantage of the accelerometer 336 is that it is located on the outside of the crusher 301, and is thus well protected from the material being crushed. Another advantage is that no major operations are required in the crusher 301 to mount the accelerometer 336. A measuring instrument 340, which in addition to the load signal receiver 342 and the rotation measuring signal receiver 344 also includes a correlating device in the form of a calculation processor 348 and a display screen 350, may then, according to the principles described above, match a measured instantaneous load with a corresponding gyrating position of the inner shell 320 relative to the outer shell 322, i.e., a corresponding position of the CSS, and display the result in a diagram, for example a diagram as shown in any one of FIGS. 6, 8, 10 and 11.

Thus, the present invention may be used in different types of gyratory crushers, and both the instantaneous load and the current gyrating position of the inner shell relative to the outer shell may be measured in different ways and with different devices.

It has been described above how a magnetic sensor 38 may be used for direct measuring of the gyrating position of the inner shell 20, and how an accelerometer 336 may be used for indirect measuring of the gyrating position of the inner shell 320. It will be appreciated that the magnetic sensor 38 could also be used in the crusher 301 and that the accelerometer 336 could be used in the crusher 1. It will also be appreciated that other types of sensors could be used for direct or indirect measuring of the gyrating position of an inner shell.

Two different principles for representing associated values of the load on the crusher and the position of the CSS have been described above. FIGS. 5 to 8 describe how the actual instantaneous load, as represented by an instantaneous hydraulic pressure, is coupled to a gyrating position θ. In this case, the objective of the operator is to obtain a graph 55 which is as close to a perfect circle as possible, and which is centered about the origin of coordinates, since this indicates as even a feed of material as possible to the crusher 1. In FIGS. 9-11 another principle is disclosed according to which the amplitude A and phase angle of the synchronous pressure component are calculated from associated values of the instantaneous load and the gyrating position and are illustrated by a vector 154. In this case, the objective of the operator is instead to obtain as short a vector 154 as possible, since this indicates as even a feed of material as possible to the crusher 1. Naturally, there are additional ways of representing associated values of the gyrating position and the load or the synchronous pressure component, such as bar charts, line charts, scatter diagrams, figures in tables, etc, on the display screen 50.

In connection with FIGS. 9-11, a method for calculating the amplitude and the phase angle of the synchronous pressure component has been described. It will be appreciated that there are other methods of achieving this. One possibility is to filter the signal from the manometer 32 by way of a band-pass filter adapted to the current rotational frequency of the eccentric 10.

It has been described above how an operator reads the information displayed on the display screen 50 and makes decisions regarding the feed settings, etc. As an alternative to the display screen 50, or in combination with the display screen 50, it is also possible to connect the measuring instrument 40, 140 directly to a control device. This control device can then automatically adjust, for instance by way of hydraulic cylinders, the position of, for example, a conveyor belt 56 or a vibrating feeder to obtain the best possible feed, i.e., the feed is adjusted automatically until the measuring instrument 40, 140 measures a relatively even load on the crusher along the whole inner periphery 34 of the outer shell 22.

In the above description, the indicating dial is a display screen. It will be appreciated that other types of indicating dials may be used, such as analogous indicating instruments.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

The invention claimed is:

1. A measuring instrument for indicating the load in a gyratory crusher, which includes a crushing head on which an inner shell is mounted, and a frame on which an outer shell is mounted, which outer shell defines together with the inner shell a crushing gap, a driving device being arranged to cause the crushing head to execute a gyratory pendulum movement with a view to crushing material that is introduced in the crushing gap wherein the measuring instrument comprises:
a first measuring device for measuring instantaneous loads on the crusher,
a second measuring device for measuring the gyrating position of the inner shell relative to the outer shell, and
a correlating device, which is adapted to match each of said instantaneous loads on the crusher with a corresponding measured gyrating position of the inner shell relative to the outer shell.

2. The measuring instrument according to claim 1, further comprising an indicating dial, which is arranged to optically indicate said measured gyrating position and the instantaneous load matched therewith.

3. The measuring instrument according to claim 1, further comprising an indicating dial, which is arranged to optically indicate at which point along the inner periphery of the outer shell the measured instantaneous load is the highest.

4. The measuring instrument according to claim 1, further comprising an indicating dial, which is arranged to optically indicate at which point along an inner periphery of the outer shell the measured instantaneous load is the highest, and to indicate a size of the measured instantaneous load at this point.

5. The measuring instrument according to claim 4, wherein the indicating dial includes a vector, which originates from an origin of coordinates and points towards a point along the inner periphery of the outer shell at which a synchronous component of the measured load is the highest length of said vector corresponding to an amplitude of the synchronous pressure component.

6. The measuring instrument according to claim 2, wherein the indicating dial includes a polar graph, which originates from an origin of coordinates and which shows the load measured in at least three points along an inner periphery of the outer shell.

7. A method of indicating the functioning of a gyratory crusher, which includes a crushing head on which an inner shell is mounted, and a frame on which an outer shell is mounted, which outer shell defines together with the inner shell a crushing gap, a driving device being arranged to cause the crushing head to execute a gyratory pendulum movement with a view to crushing material that is introduced in the crushing gap, comprising
measuring instantaneous loads on the crusher;
measuring the gyrating position of the inner shell relative to the outer shell; and
matching each of said instantaneous loads with the corresponding measured gyrating position of the inner shell relative to the outer shell.

8. The method according to claim 7, further comprising determining and matching the highest measured load along the inner periphery of the outer shell with a corresponding gyrating position of the inner shell relative to the outer shell.

9. The method according to claim 7, wherein said measured gyrating position and the instantaneous load matched therewith are optically indicated.

10. A gyratory crusher, comprising:
a crushing head on which an inner shell is mounted;
a frame on which an outer shell is mounted, which outer shell defines together with the inner shell a crushing gap;
a driving device being arranged to cause the crushing head to execute a gyratory pendulum movement with a view to crushing material that is introduced in the crushing gap;
a measurement instrument including a first measuring device for measuring at least one instantaneous loads on the crusher,
a second measuring device for measuring the gyrating position of the inner shell relative to the outer shell, and
a correlating device, which is adapted to match each of said instantaneous loads on the crusher with a corresponding measured gyrating position of the inner shell relative to the outer shell.

11. The gyratory crusher according to claim 10, in which the crusher further includes a device for measuring the current rotary position of an eccentric incorporated in the crusher and arranged to cause the crushing head to execute the gyratory pendulum movement.

12. The gyratory crusher according to claim 10, further comprising an accelerometer for measuring the current gyrating position of the inner shell.

13. The measuring instrument according to claim 2, wherein the indicating dial is a display screen.

* * * * *